United States Patent [19]
Kuffel

[11] 3,713,845
[45] Jan. 30, 1973

[54] CHIFFON CAKE MIX

[75] Inventor: Richard A. Kuffel, St. Louis Park, Minn.

[73] Assignee: General Mills, Inc.

[22] Filed: Nov. 5, 1970

[21] Appl. No.: 87,329

[52] U.S. Cl. .................................................99/94
[51] Int. Cl. ...........................A21d 2/00, A21d 2/02
[58] Field of Search...................................99/92, 94

[56] References Cited

UNITED STATES PATENTS 3,078,168  2/1963  Bedenk ...............................99/94
3,096,179  7/1963  Finucane et al. ...................99/94

Primary Examiner—Raymond N. Jones
Attorney—Anthony A. Juettner, Gene O. Enockson and Elizabeth Tweedy

[57] ABSTRACT

Chiffon cake mix using starch as the amylaceous ingredient. This chiffon cake mix exhibits a stable foam structure during the preparation operation thus avoiding one of the major disadvantages encountered in using previously known chiffon cake mixes.

6 Claims, No Drawings

CHIFFON CAKE MIX

This invention relates to a chiffon cake dry mix composition which can be made into a chiffon cake with substantially no risk of the batter collapsing during preparation or baking. More particularly, this invention relates to chiffon cake dry mixes in which the amylaceous ingredient is a natural starch.

The conventional chiffon cake dry mix is packaged in two portions. One portion is a dry cake batter mix composed principally of flour, shortening, sugar, a chemical leavening system and flavoring. The other is a foam dry mix composed principally of sugar, dry egg whites and flavoring. The chiffon cake batter itself is prepared by separately rehydrating the two portions and then carefully combining them. The egg white foam dry mix portion is rehydrated in cold water and beaten, generally with an electric mixer, until the foam forms stiff upright peaks. Normally about 170 to 180 grams of egg white foam dry mix is rehydrated and beaten with about 290 to 300 grams of water. The cake batter dry mix portion is mixed and rehydrated with cold water with two fresh eggs being added. Generally about 355 to 365 grams of the cake batter dry mix is mixed and rehydrated with about 55 to 65 grams of water. After rehydrating the respective portions, the rehydrated cake batter portion is poured over the stiff rehydrated foam portion and the two portions are carefully folded together by hand mixing to form the chiffon cake batter. In combining the two portions, about 1.3 to 3.0 parts of weight egg white foam dry mix is used to one part cake dry mix. The final chiffon cake batter is poured into an ungreased pan and baked usually at a temperature of about 350°F. for a period of 45 to 55 minutes.

Typically, the cake batter dry mix portion of the conventional chiffon cake dry mix includes about 45 percent to 60 percent cake flour by weight of the cake batter dry mix portion, about 30 percent to 50 percent and preferably about 32 percent to 38 percent sucrose by weight of the cake batter dry mix portion, about 1 percent to 16 percent and preferably about 8 percent to 16 percent shortening by weight of the cake batter dry mix portion, leaveners and flavorings. The flour is usually a soft wheat flour. The shortening may be liquid or plastic, of animal or vegetable origin and includes plasticized lard, hydrogenated vegetable oils and rearranged lards. Any of a wide variety of chemical leavening systems or compositions are available and can be used. Normally the chemical leavening consists of a combination of sodium bicarbonate and an acidifier. Representative acidifiers which can be used include glucona-delta lactone, potassium bitartrate, tartaric acid, disodium phosphate, sodium aluminum sulfate, sodium aluminum phosphate, sodium acid pyrophosphate, anhydrous monocalcium phosphate, monocalcium phosphate monohydrate, citric acid, fumaric acid, adipic acid and the like. Mixtures of the various acidifiers can be used. Also, other carbonates and bicarbonates such as $Na_2CO_3$, $KHCO_3$ and $(NH_4)_2CO3$ may be used. Commercially available baking powders are entirely suitable but are not normally used by the mix manufacturer. The chemical leavening is generally used at a level of less than about 10 percent by weight based on the weight of the dry cake mix portion and preferably in the range of about 0.5 percent to 5.0 percent by weight.

The cake batter dry mix portion of the conventional chiffon cake batter dry mix is made by blending the ingredients in a dry state to form a reasonably homogeneous mixture. A number of variations in methods of dry blending are currently used. In some instances, a premix of two or more ingredients is made and added to a mixture of the other ingredients. In some procedures, the shortening is kept in a liquid form until the blending is completed and, in other instances, the temperature is held low enough so that the shortening is easily broken into small pieces and these small pieces are distributed throughout the mixture.

The egg white foam dry mix portion of the conventional chiffon cake dry mix includes about 70 percent to 90 percent sucrose by weight of the egg white foam mix portion, about 10 percent to 29 percent dry egg whites by weight of the egg white foam mix portion and flavoring. The egg whites are usually spray dried. To improve whipping stability the glucose is usually removed from the egg whites during manufacture and whipping aids such as sodium lauryl sulfate in amounts of about 0 percent to 0.1 percent by weight may be added. The mix is made by dry blending the ingredients.

The major difficulty encountered in using the conventional chiffon cake dry mix lies in the sucessful combining of the rehydrated portions. Any interruption of the folding process or over agitation of the mixture during the folding process results in the collapse or stratification of the chiffon cake batter and failure of the final cake. Due to the critical nature of the preparation, there is a wide variation in the textures of even uncollapsed chiffon cakes.

The chiffon cake dry mixes of the present invention overcome the difficulties previously encountered in combing the two portions of the conventional chiffon cake dry mix to make acceptable batters. As in conventional dry mixes, the chiffon cake batter dry mixes of the present invention involve two portions, a cake batter dry mix portion and a foam dry mix portion. In combining the two portions, the rehydrated cake mix batter portion can be poured onto the rehydrated egg white foam mix and the mixture allowed to stand for 10 or 15 minutes without causing the collapse of the rehydrated egg white foam portion or collapse or stratification of the resulting chiffon cake batter. In addition, the cake mix batter can be beaten into the foam without causing collapse or stratification of the resulting chiffon cake batter. Furthermore, good, uniformly textured cakes can be obtained as the criticality of preparation is substantially obviated.

The cake batter dry mix portion of the chiffon cake dry mix of the present invention comprises about 40 percent to 55 percent natural starch by weight of the cake batter dry mix portion, about 1 percent to 16 percent and preferably about 8 percent to 16 percent shortening by weight of the cake batter dry mix portion, about 30 percent to 50 percent sucrose by weight of the cake batter dry mix, about 0.50 percent to 10 percent chemical leavening system by weight of the cake batter dry mix portion and flavoring. Natural wheat starch is normally used in the cake dry mix portion of the chiffon cake dry mix. Starches derived from other materials such as corn, rice, arrowroot, potato, tapioca, sago, sorghum and soy, however, can be used. It should be borne in mind that the properties of each starch are somewhat different and require some adjustment of the system to compensate for these differences. For example, it is well known that starches fall into three groups of increasing moisture uptake in the following order: cereal starches (wheat, maize and rice), pith or root starches (sago, arrowroot, sweet potato) and tubers (white potatoes). Most starches, however, follow the same general behavior pattern during swelling. In cold water most starches swell only to a limited extent until the temperature reaches about 60°C. At this temperature the starch granules begin to swell rapidly with increasing temperature and the subsequent swelling behavior varies considerably form starch to starch. It is known that the presence of ionic surfactants effects the swelling behavior of starches. For example, sodium lauryl sulfate commonly incorporated in dried egg whites as a whipping aid represses the solubility of corn and potato starches at temperatures below about 85°C., but shows a reverse effect at higher temperatures. On the other hand, sodium lauryl sulfate drastically increases the swelling of wheat starch at a temperature of 85°C. In addition, the particular manufacturing process employed will effect the gelatinization behavior of each of the starches. Among the factors in manufacture effecting starch behavior is the extent of case hardening due to drying. The shortenings that can be used in the cake batters of this invention are generally the same as those normally used in the conventional chiffon cake mixes and in about the same amounts which is about 1 percent to 16 percent and preferably about 8 percent to 16 percent by weight of the cake batter dry mix portion. The sucrose used in the cake batter dry mix is finely ground as is common in dry mixes. Finely ground sucrose frequently contains starch in amounts up to about 5 percent by weight as a means of preserving the free flowing character of the sucrose. Optimum results have been obtained in the practice of the present invention when sucrose is present in the cake batter dry mix portion in amounts of from about 55 percent to 75 percent by weight based upon the weight of the starch. The leavening system used is the same as is normally incorporated into the conventional chiffon cake dry mix.

The egg white foam dry mix portion of the chiffon cake dry mix of the present invention comprises about 66.0 percent to 87.0 percent sucrose by weight of the egg white foam dry mix portion, about 13.0 percent to 34.0 percent dried egg white by weight of the egg white foam dry mix portion, and flavorings. Again starch may be present to preserve the free flowing character of the sucrose. Preferably the amount of sucrose in the two dry mix portions is between about 40 percent to 60 percent of the weight of the combined weight of the two dry mix portions.

The manufacture of the two dry mix portions can be carried out in the same manner as the manufacture commonly used in making the two mix portions for conventional chiffon cake dry mixes.

In the preparation of cakes from the chiffon cake dry mixes of this invention, the same water to dry mix ratios are normally used as in making up cakes from conventional dry mixes discussed above. The amount of water used can be varied; however, at least 25 percent in making up the rehydrated egg white foam portion and the rehydrated cake batter portion. The rehydrated egg white foam and rehydrated cake batter can be combined by hand mixing or mechanical mixing. The resulting batter is normally baked at a temperature of about 325° to 400°F.

The rehydrated cake batter portion of this invention is somewhat thinner than flour based batters. A further improvement in the stability of the batter and foam mixture during the combining operation can be achieved when a batter thickener and syneresis inhibitor is incorporated into the cake dry mix portion. Included among the batter thickeners and syneresis inhibitors are the water soluble natural and synthetic gums such as guar gum, locust bean gum, gum acacia and carboxymethyl cellulose. Good results were obtained when xanthamonas gum was incorporated into the cake batter dry mix portion. The gums can be used in concentrations of from about 0.05 percent to 5.0 percent by weight of the cake batter dry mix portion. Preferably they are incorporated into the cake batter dry mix portion in amounts of from 0.20 percent to 0.40 percent by weight of the cake batter dry mix portion.

The grain of the cakes made from mixes containing starch is finer than the grain of cakes made from mixes containing flour. If desired, the grain of the cakes made from mixes containing starch can be adjusted to correspond to the grain of cakes made from mixes containing flour by adding calcium chloride to the egg white foam dry mix portion. The calcium chloride can be used up to amounts of about 5 percent weight of the egg white foam dry mix portion and preferably between about 0.05 percent to 1.0 percent by weight of the egg white foam dry mix portion.

To better illustrate the advantages and product characteristics of the chiffon cake of the present invention, specific examples of various formulations are set out below in detail.

EXAMPLE I

This example illustrates the tolerance of the cake batter compositions of this invention to variations in preparation procedure. Four different methods of combining the portions are shown below.

A control dry mix for cakes containing flour and a sample dry mix for cakes containing starch were made from the ingredients shown below.

| Cake Batter Dry Mix Portion | Percentage by weight of cake batter mix portion | |
|---|---|---|
| | Control | Sample |
| Wheat Starch (Aytex, General Mills, Inc.) | — | 47.880 |
| Soft Wheat Cake Flour* | 49.270 | — |
| Sucrose (containing 2% wheat starch by weight) | 34.884 | 36.274 |
| Vegetable Oil | 11.850 | 11.850 |
| Flavoring | 2.180 | 2.180 |
| Sodium Bicarbonate | 0.530 | 0.530 |
| Salt | .470 | .470 |
| Anhydrous Monocalcium Phosphate | .380 | .380 |
| Sodium Acid Pyrophosphate | .380 | .380 |
| Color | .056 | .056 |
| Total | 100.000 | 100.000 |

*The chemical composition of the cake flour was:
Moisture — 14.0% by weight maximum
Protein — 8.3 to 8.9% by weight (14% moisture basis)
Ash — 0.33 to 0.37% by weight (14% moisture basis)
pH — 4.6 to 4.9

The cake flour was chlorine bleached and pin milled.

| Foam Dry Mix Portion | Percentage by weight of dry mix portion |
|---|---|
| Sucrose (containing 4.5% wheat starch) | 82.00 |
| Egg white, dry (containing up to 0.1% sodium lauryl sulfate) | 17.90 |
| Vanilla Powder | 0.10 |
| Total | 100.00 |

The controls and samples were prepared as follows to the point of combining the rehydrated cake batter with rehydrated foam portion. 362 grams of each cake mix portion, 60 grams of water and 100 grams whole eggs were beaten for about 2 minutes with an electric mixer to form a cake batter. A foam portion was rehydrated for each cake mix sample. 173 grams of the foam dry mix and 300 grams of water were beaten with an electric mixer for a period of about 7 minutes to form a foam having stiff upright peaks.

In the first series of preparation the portions were combined in the conventional manner of pouring the rehydrated cake batter over the stiff rehydrated foam and folding the rehydrated cake batter into the rehydrated foam with a rubber scraper, pouring into an ungreased 10 × 4 inch tube pan and baking at a temperatures of about 350°F. for a period of 50 minutes.

In the second series of preparation the portions were combined by pouring the rehydrated cake batter over and folding it into the stiff rehydrated foam with a rubber scraper, allowing the mixture to stand for a period of 10 minutes, and then pouring it into an ungreased pan and baking as in Series 1.

In the third series of preparation the portions were combined using an electric mixer and then poured into an ungreased pan and baked as in Series 1.

In the fourth series of preparation the portions were combined using an electric mixer and allowing the mixture to stand ten minutes and then pouring into an ungreased pan and baking as in Series 1.

The results obtained in each case are shown below in Table 1.

TABLE 1

| Sample | Height of Cake (mm) | Grain of Cake |
|---|---|---|
| Series 1, Control containing flour | 125 | Too open, irregular, stratified |
| Series 1, Sample containing starch | 120 | Very slightly open, slightly irregular, slightly stratified |
| Series 2, Control containing flour | 125 | Too open, irregular |
| Series 2, Sample containing starch | 115 | Slightly irregular |
| Series 3, Control containing flour | 115 | Too open, irregular |
| Series 3, Sample containing starch | 110 | Slightly irregular |
| Series 4, Control containing flour | 110 | Too open, irregular |
| Series 4, Sample containing starch | 106 | Slightly irregular, slightly open, slightly stratified |

The grain of the cakes made from starch was consistently good as opposed to the greater stratification and irregularity in the cakes made from flour.

EXAMPLE II

This example shows the product characteristics of baked cakes made from dry mixes containing different cake flours and baked cakes made from dry mixes containing wheat starch.

The ingredients in the cake mix portion are:

| | Percent By Weight | | |
|---|---|---|---|
| | A | B | C |
| Soft wheat cake flour I* | 49.270 | — | — |
| Soft wheat cake flour II** | — | 49.270 | — |
| Wheat Starch (Aytex, General Mills, Inc.) | — | — | 49.270 |
| Sucrose (Containing 2% wheat starch by weight) | 34.884 | 34.884 | 34.884 |
| Vegetable Oil (Mazola Oil, Best Foods) | 11.850 | 11.850 | 11.850 |
| Orange Flavor | 2.180 | 2.180 | 2.180 |
| Soda | 0.530 | 0.530 | 0.530 |
| Anhydrous Monocalcium Phosphate | 0.380 | 0.380 | 0.380 |
| Sodium Acid Pyrophosphate | 0.380 | 0.380 | 0.380 |
| Color | 0.056 | 0.056 | 0.056 |
| Totals | 100.000 | 100.000 | 100.000 |

The ingredients in the foam mix portion for samples A, B and C were:

| | Percent By Weight |
|---|---|
| Sucrose (containing 4.5% wheat starch) | 82.00 |
| Egg white, dry (containing up to 0.1% sodium lauryl sulfate) | 17.90 |
| Vanilla Powder | 0.10 |
| Total | 100.00 |

*The chemical composition of cake flour I was:
Moisture— 14.0% by weight maximum
Protein— 8.3 to 8.9% by weight (14% moisture basis)
Ash— 0.33 to 0.37% by weight (14% moisture basis)
pH— 4.6 to 4.9
The cake flour was chlorine bleached and pin milled.

**The chemical composition of cake flour II was:
Moisture— 9 to 10% by weight maximum
Protein— 4.0 to 4.5% by weight (14% moisture basis)
Ash— 0.29 to 0.33% by weight (14% moisture basis)
pH— 3.8 to 4.1
The cake flour was pin milled.

Three hundred sixty two grams of each cake mix portion, 59 grams of water and two whole eggs were beaten for about 2 minutes with an electric mixer to form a cake batter.

A foam portion was rehydrated for each cake mix sample. 174 grams of the foam dry mix and 296 grams of water were beaten with an electric mixer for a period of about 7 minutes to form a foam having stiff upright peaks.

The rehydrated cake batter was then poured over the stiff rehydrated foam and folded into it by hand using a rubber scraper. The resulting mixture was poured into an ungreased 10 × 4 inch tube pan and baked at a temperature of about 350°F. for a period of about 50 minutes. The cake was then removed from the oven and the pan turned upside down, the tube being supported by a bottle. The cake is allowed to cool to room temperature.

The characteristics of the sample cakes are shown below in Table 2.

TABLE 2

Product Characteristics of Cakes Containing Flour And Cakes Containing Starch

| Characteristics | Samples | | |
|---|---|---|---|
| | A | B | C |
| Specific Gravity | 0.96 | 1.05 | 1.00 |
| Height of Cake (mm) | 129 | 123 | 125 |
| Consistency | good | good | good |
| Grain | good | good | good |
| Texture | good | good | good |

As can be seen from the specific characteristics of the finished cakes, Sample C, containing wheat starch, was comparable to Samples A and B containing different wheat flours.

EXAMPLE III

This example illustrates the use of calcium chloride in the foam mix portion. The basic formulation of the cake mix portions were the same as shown in Example II. To the foam mix formulation calcium chloride was added. Sample cakes were prepared according to the procedure set out in Example II. The product characteristics of the samples are shown in Table 3.

TABLE 3

Product Characteristics of Cakes Containing Flour and Calcium Chloride and Cakes Containing Starch and Calcium Chloride

| | Samples | | | |
|---|---|---|---|---|
| | 1 | 2 | 3 | 4 |
| Cake Mix Formulation From Example II | A | B | C | C |
| Amount of $CaCl_2$ added to foam mix portion | 0.05% | 0.05% | 0.05% | 1.00% |
| Specific Gravity | 0.96 | 1.05 | 1.00 | 1.00 |
| Height (mm) | 126 | 123 | 125 | 128 |
| Consistency | Good | Good | Good | Good |
| Grain | Good | Good | Good | Good |
| Texture | Good | Good | Good | Good |

Though there was no demonstrable increase in volume attributable to the use of $CaCl_2$ the use of $CaCl_2$ provided a more open and even grain to all of the samples as compared to the samples described in Example II.

EXAMPLE IV

This example illustrates the preparation stability of one of the preferred embodiments of the chiffon cake mixes of the present invention when the cake mix portion and the foam portion are combined by beating with an electric beater. Three samples were made: one containing flour in the cake mix portion and two containing starch in the cake mix portion. The two starch samples also contain calcium chloride in the foam mix portion and a water soluble gum in the cake mix portion.

The ingredients in the foam mix portions are as follows:

| | Samples Percent By Weight | | |
|---|---|---|---|
| | AF | BF | CF |
| Sucrose (containing 4.5% wheat starch | 82.00 | 82.00 | 82.00 |
| Egg white, dry | 17.90 | 17.15 | 16.90 |
| Calcium Chloride | — | 0.75 | 1.00 |
| Vanilla Powder | 0.10 | 0.10 | 0.10 |
| Totals | 100.00 | 100.00 | 100.00 |

The ingredients in the cake mix portion are as follows:

| | Samples Percent By Weight | |
|---|---|---|
| | AC | BC |
| Soft wheat cake flour* | 49.270 | — |
| Wheat Starch (Aytex, General Mills, Inc.) | — | 49.270 |
| Sucrose (Containing 2% wheat starch) | 34.884 | 34.664 |
| Vegetable Oil (Mazola Oil, Best Foods) | 11.850 | 11.850 |
| Orange Flavor | 2.180 | 2.180 |
| Soda | 0.530 | 0.530 |
| Salt | 0.470 | 0.470 |
| Anhydrous Monocalcium Phosphate | 0.380 | 0.380 |
| Sodium Acid Pyrophosphate | 0.380 | 0.380 |
| Xanthamonas Gum | — | 0.220 |
| Color | 0.056 | 0.056 |
| Totals | 100.000 | 100.000 |

*The chemical composition of the cake flour was:
Moisture— 9 to 10% by weight
Protein— 3.3 to 3.7% by weight (14% moisture basis)
Ash— 0.29 to 0.33% by weight (14% moisture basis)
pH— 3.5 to 3.8
The cake flour was chlorine bleached and pin milled.

The foam mix and cake mix portions were rehydrated and mixed according to the procedure described in Example II. The combining step was carried out by blending the rehydrated cake mix batter into the foam while beating the mixture with an electric mixer. The beating with the electric mixer was conducted for a period of about two minutes. The cakes were then baked according to the procedure set out in Example II.

The characteristics of the final cakes are shown in Table 4.

TABLE 4

Characteristics of Cakes Prepared By Combining The Foam With The Cake Batter By Beating With An Electric Beater

| Characteristics | Samples | | |
|---|---|---|---|
| | AF-AC | BF-BC | CF-BC |
| Specific Gravity | 1.04 | 0.97 | 0.95 |
| Height (mm) | 85 | 118 | 120 |
| Consistency | collapsed | good | good |
| Grain | collapsed | good | good |

As can be readily seen, the cake batters containing starch could be mixed with the foam with an electric beater to produce an acceptable final product and that the conventional flour based cake collapsed.

The embodiments of the invention in which an exclusive property or privilege is claimed are defined as follows:

1. A chiffon cake dry mix having a cake batter dry mix portion and an egg white foam dry mix portion wherein the cake batter dry mix portion consists essentially of:
   about 40 percent to 55 percent natural starch by weight of the cake batter dry mix portion,
   about 30 percent to 50 percent sucrose by weight of the cake batter dry mix portion,
   about 1 percent to 16 percent shortening by weight of the cake batter dry mix portion, and
   about 0.5 percent to 10 percent chemical leavening system by weight of the cake batter dry mix portion
wherein the egg white dry mix portion consists essentially of:
   about 66.0 percent to 87.0 percent sucrose by weight of the egg white foam dry mix portion and
   about 13.0 percent to 34.0 percent dried egg white by weight of the egg white foam dry mix portion,
and wherein the cake batter dry mix portion and the egg white dry mix portion are in a ratio of one part by weight cake batter dry mix and 1.3 to 3.0 parts by weight dried egg white foam dry mix.

2. The chiffon cake dry mix of claim 1 wherein the shortening in the cake batter dry mix portion is present in amounts from about 8 percent to 16 percent by weight of the cake batter dry mix portion.

3. The chiffon cake dry mix of claim 1 wherein the natural starch in the cake batter dry mix portion is wheat starch.

4. The chiffon cake dry mix of claim 1 wherein the sucrose in the cake batter dry mix portion is present in the amount of from about 55 percent to 75 percent by weight based upon the weight of the starch in the cake batter dry mix.

5. A chiffon cake dry mix having a cake batter dry mix portion and an egg white foam dry mix portion, wherein the cake batter dry mix portion consists essentially of:
   about 40 percent to 55 percent natural starch by weight of the cake batter dry mix portion;
   about 30 percent to 50 percent sucrose by weight of the cake batter dry mix portion;
   about 8 percent to 16 percent shortening by weight of the cake batter dry mix portion;
   about 0.5 percent to 10.0 percent chemical leavening system by weight of the cake batter dry mix portion;
   about 0.20 percent to 0.40 percent batter thickeners and syneresis inhibitors selected from natural and synthetic gums by weight of the cake batter dry mix portion;
wherein the egg white foam dry mix portion consists essentially of:
   about 66.0 percent to 87.0 percent sucrose by weight of the egg white dry mix portion,
   about 13.0 percent to 34.0 dried egg white by weight of the egg white foam dry mix portion, and
   about 0.05 percent to 1.0 percent calcium chloride by weight of the egg white foam dry mix portion,
and wherein the cake batter dry mix portion and the egg white foam dry mix portion are in a ratio of one part by weight cake batter dry mix and 1.3 to 3.0 parts by weight dried egg white foam dry mix.

* * * * *